J. G. LANE.
Coffee Mill.

No. 58,946.

Patented Oct. 16, 1866.

Witnesses:
Wm Trewin
F. A. Jackson.

Inventor:
J. G. Lane.
Per Munn & Co.
Attorneys.

UNITED STATES PATENT OFFICE.

J. G. LANE, OF WASHINGTON, NEW YORK, ASSIGNOR TO HIMSELF AND W. J. LANE, OF SAME PLACE.

IMPROVEMENT IN COFFEE-MILLS.

Specification forming part of Letters Patent No. 58,946, dated October 16, 1866.

*To all whom it may concern:*

Be it known that I, J. G. LANE, of Washington, in the county of Dutchess and State of New York, have invented a new and useful Improvement in Mills for Grinding Coffee, Spice, &c.; and I do hereby declare that the following is a full, clear, and exact description thereof, which will enable others skilled in the art to make and use the same, reference being had to the accompanying drawings, forming part of this specification, in which—

Figure 1:
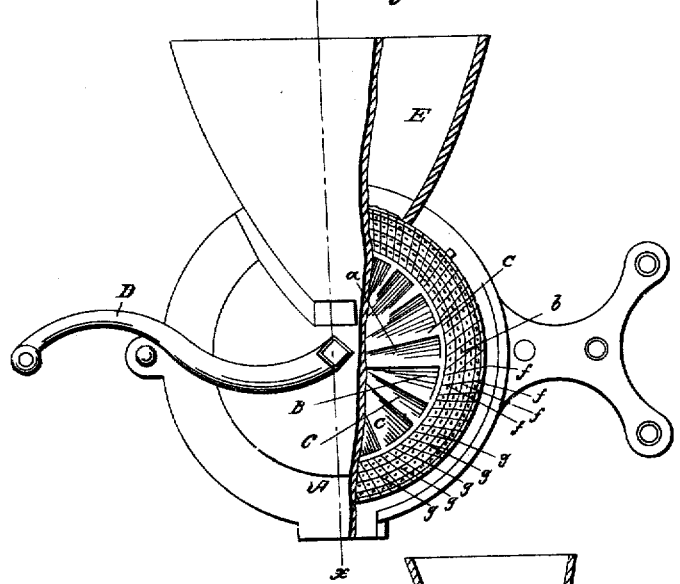
Figure 2:
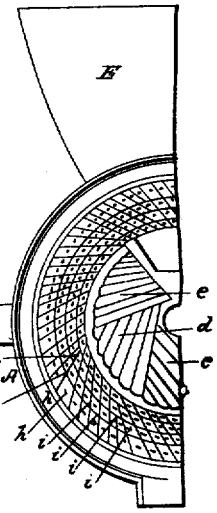
Figure 3:
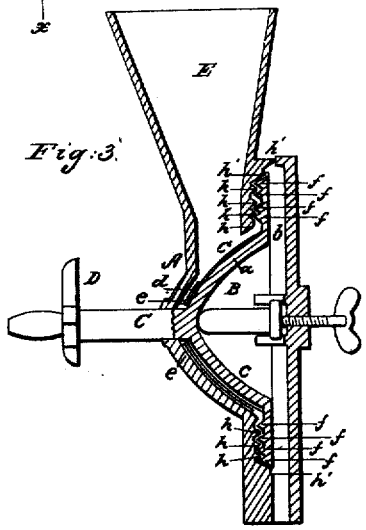

Figure 1 is a front view of my invention, partly in section; Fig. 2, a sectional view of the hopper and case of the mill, with a face view of the grinding-surface on the case; Fig. 3, a vertical section of the same, taken in the line $x\,x$, Fig. 1.

Similar letters of reference indicate like parts.

This invention relates to a new and useful improvement on the conical grinding-mills now generally employed for grinding coffee, spice, &c.; and it consists in a simple modification of the grinding surfaces or plates, as hereinafter fully shown and described, whereby the discharge of the substance being ground may be regulated as desired and the substance ground to the required degree of fineness.

A represents the case of the mill, and B the grinding-plate, fitted therein on a shaft, C, one end of the latter passing through the case, and having a crank, D, attached.

E is the hopper, in which the substance to be ground is placed.

The grinding-plate B has a conical surface, $a$, and a flat or plane surface, $b$. The former, $a$, is used for crushing or cracking, and is provided with coarse ridges or teeth $c$. This conical surface $a$ works in a conical recess, $d$, in the case A, said recess being provided with ridges $e$. (See Fig. 2.)

The flat or plane surface $b$ is provided with fine teeth, and they may be described as being formed of circular ridges $f$, notched at suitable distances apart by means of oblique grooves, $g$. (Shown more particularly in Fig. 1.)

The case A, at the side or part opposite the flat or plane surface of the plate B, is provided with circular ridges $h$, which fit between the ridges $f$ of the plate B, (see Fig. 3,) the ridges $h$, with the exception of the outermost one, $h'$, being notched by grooves $i$. (See Fig. 2.)

The grooves $g\,i$ form channels of communication between the spaces or channels formed by the ridges $f\,h$, and allow the ground substance to pass from the mill.

The difficulty with the old mills, however, or those now in use, is that the grooves $g\,i$ allow the substance being ground to escape too freely from the mill before the teeth can act upon the substance to reduce it to a proper degree of fineness; and to obviate this difficulty I leave the outermost ridge, $h'$, of the case A solid, said ridge extending around the outermost ridge, $f$, on the plate B.

By this arrangement it will be seen that the substance being ground cannot escape too readily from the mill when the grinding-surfaces are set together, as the channels or grooves $i$ do not extend across the outermost ridge, $h'$, of the case A, and this ridge serves as a barrier to the substance being ground, allowing the teeth to pulverize it to any degree of fineness required as regulated by the set-screw.

The plate B may be adjusted as usual by a set-screw, F, bearing against one end of a short shaft, C', which is fitted within the conical part of the plate B, as shown in Fig. 3.

I do not claim a grinding-plate for coffee and spice mills composed of a conical and flat or plane grinding-surfaces working opposite fixed or stationary corresponding surfaces on the case of the mill; but I do claim as new and desire to secure by Letters Patent—

Having the outermost ridge, $h'$, of the grinding-surface of case A solid, or without being notched, and extending around the outermost ridge, $f$, of the corresponding grinding-surface on plate B, so as to serve as a barrier to the too free discharge from the mill of the substance being ground, substantially as herein set forth.

J. G. LANE.

Witnesses:
WM. F. McNAMARA,
ALEX. F. ROBERTS.